INVENTOR.
M. E. REINECKE
A. B. BROERMAN
BY
*Hudson + Young*
ATTORNEYS

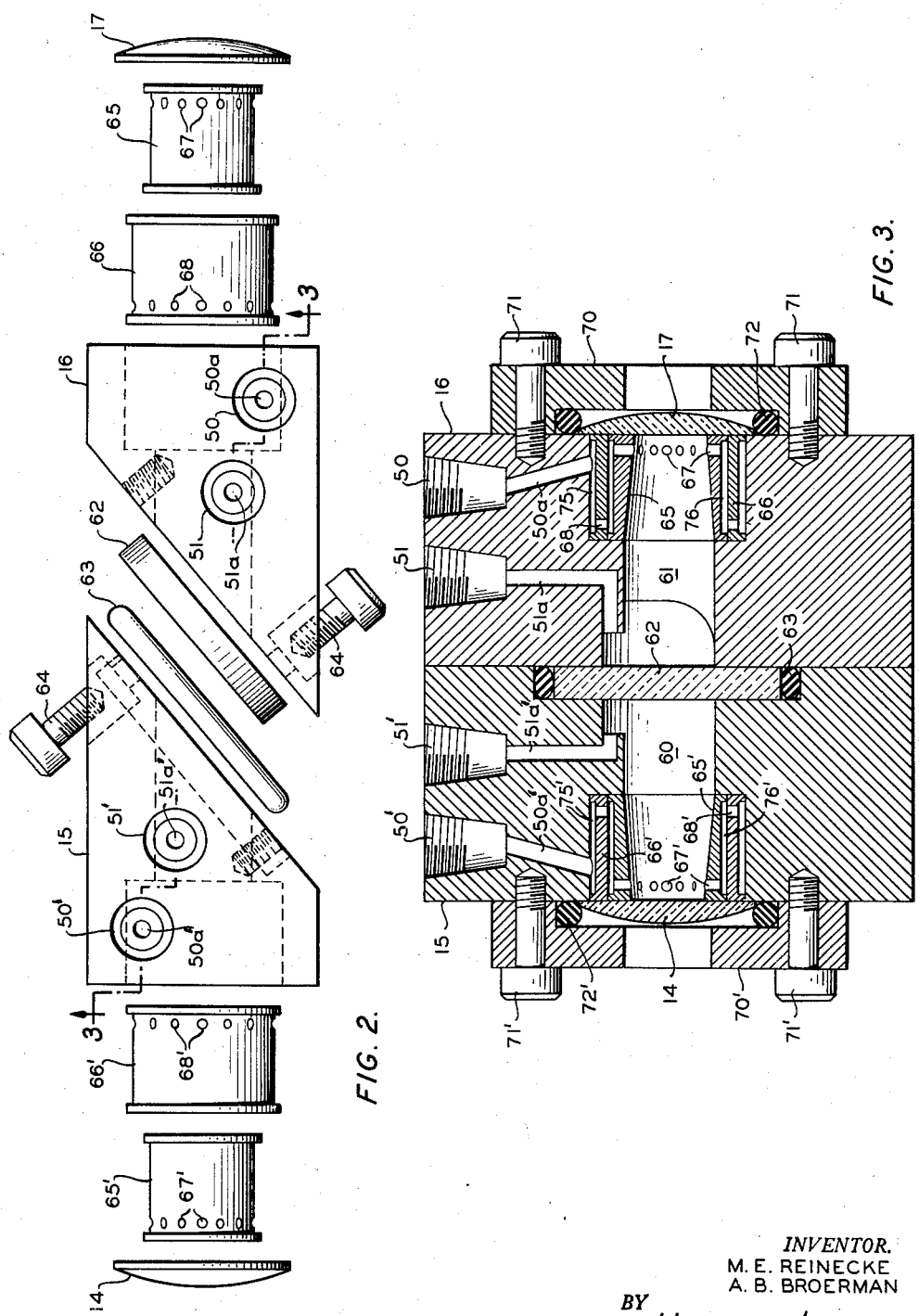

Oct. 28, 1958     M. E. REINECKE ET AL     2,857,803
DIFFERENTIAL REFRACTOMETER CELL

Filed March 12, 1956     3 Sheets-Sheet 3

INVENTOR.
M. E. REINECKE
A. B. BROERMAN
BY
*Hudson & Young*
ATTORNEYS

United States Patent Office 2,857,803
Patented Oct. 28, 1958

2,857,803

DIFFERENTIAL REFRACTOMETER CELL

Marvin E. Reinecke and Arthur B. Broerman, Bartlesville, Okla., assignors to Phillips Petroleum Company, a corporation of Delaware Application March 12, 1956, Serial No. 570,761

12 Claims. (Cl. 88—14)

This invention relates to the measurement of the refractive indices of fluid streams.

In various chemical and petroleum operations, it is common practice to analyze a sample stream removed from some point in the process and to adjust an operating variable in response to the analysis to maintain desired conditions. One particular system of analysis that is useful involves a measurement of the refractive index of the sample stream. This measurement can advantageously be made by comparing the refractive index of the sample stream with the refractive index of a reference fluid. This is accomplished by directing a beam of radiation through a refractometer cell assembly and measuring the deviation of the emerging beam. The refractometer cell is provided with at least two adjacent compartments which are separated by a diagonal transparent plate. A reference fluid is positioned in one chamber and the sample stream is circulated continuously through the second chamber. An instrument of this type is generally referred to as a differential refractometer.

In order to make accurate measurements with differential refractometers, it is important that the two fluids being compared be maintained at exactly the same temperatures and pressures. This is particularly true in measuring the refractive indices of liquids because such refractive indices vary considerably with changes in temperature and pressure. In accordance with the present invention a refractometer is provided wherein the temperatures and pressures of the fluids being compared are maintained equal. This is accomplished by circulating the sample stream initially through an elongated path which is in thermal contact with the reference fluid. Means are also provided to equalize any pressure differentials between the two fluids.

Accordingly, it is an object of this invention to provide an improved differential refractometer.

Another object is to provide improved differential refractometer cell assemblies wherein the fluids being compared are maintained at a common temperature.

A further object is to provide an improved refractometer wherein the two fluids being compared are maintained at common temperatures and pressures.

Other objects, advantages and features of the invention should become apparent from the following detailed description taken in conjunction with the accompanying drawing in which:

Figure 2 is an exploded view of a portion of the refractometer cell assembly of Figure 1;

Figure 3 is a sectional view taken along line 3—3 of Figure 2;

Figure 1:
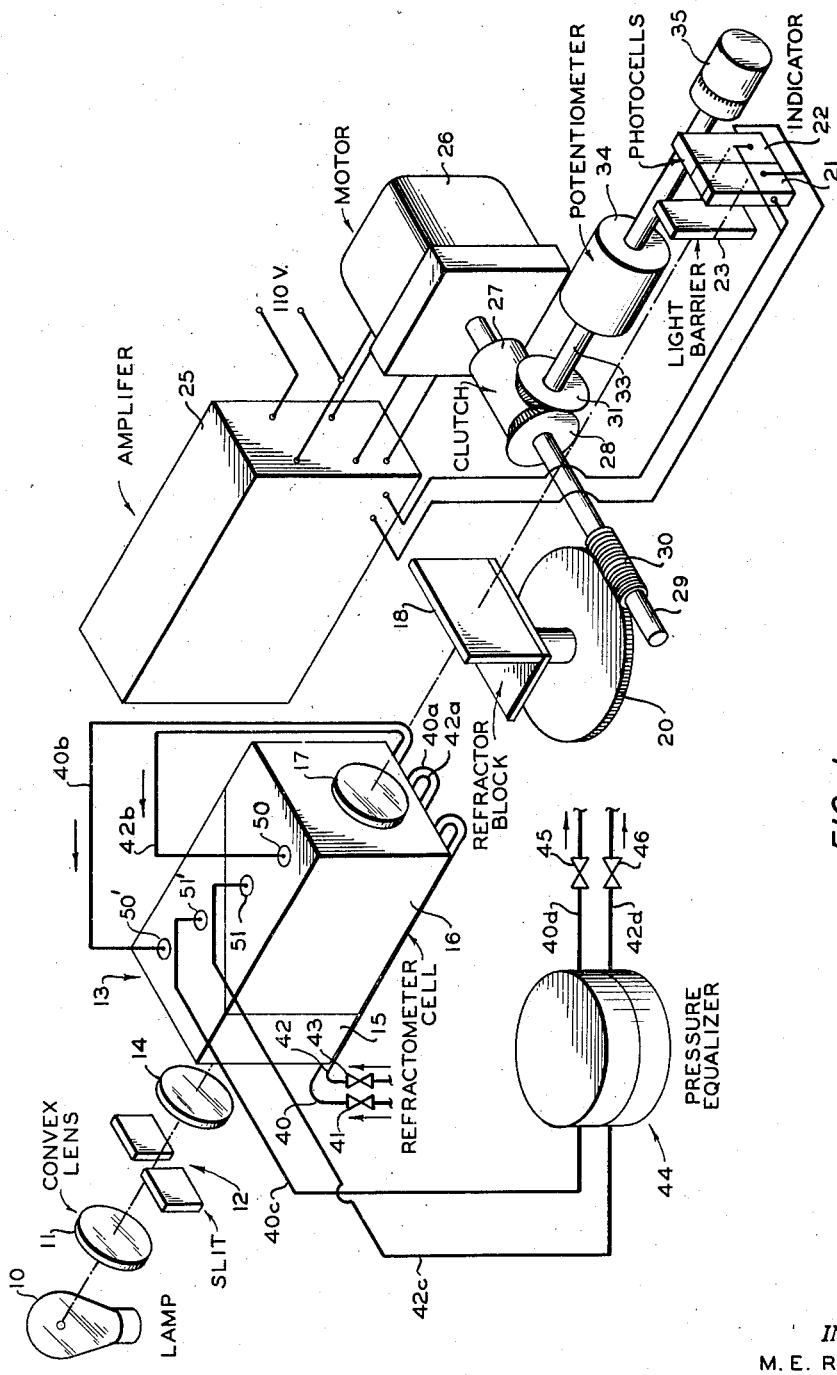
Figure 1 is a schematic view of a differential refractometer incorporating features of the present invention.

Referring now to the drawing in detail and to Figure 1 in particular, there is shown a lamp 10 which directs radiation through a convex lens 11. Radiation from lens 11 is directed through a slit assembly 12 into a refractometer cell assembly 13. Cell assembly 13 is provided with an inlet lens 14 which collimates radiation transmitted through slit 12. Cell assembly 13 comprises complementary metal blocks 15 and 16. A lens 17 at the edge of block 16 focuses the transmitted radiation on a detector which comprises adjacent photocells 21 and 22.

The beam of radiation emerging from cell assembly 13 passes through a refractor block 18 which is mounted for rotation on a worm gear 20. An opaque light barrier 23 is centered between photocells 21 and 22 to reduce the amount of radiation incident upon the two photocells.

Photocells 21 and 22 are connected in electrical opposition to one another to the input of an amplifier 25. Amplifier 25 provides an output signal which drives a servomotor 26. Amplifier 25 can be of the type which converts an input D. C. signal to an A. C. signal for amplification. The amplified signal drives a two phase induction motor 26. The drive shaft of motor 26 is connected through a clutch 27 to a shaft 29 which has a first bevel gear 28 thereon. A worm 30 is mounted on shaft 29 to engage worm gear 20. Bevel gear 28 engages a second bevel gear 31 which is connected to a shaft 33. A telemetering potentiometer 34 and a rotation indicator 35 are connected to shaft 33.

Blocks 15 and 16 of cell assembly 13 are each provided with respective fluid chambers through which the radiation beam is directed. A sample fluid to be measured is supplied to the chamber in block 15 by means of an inlet conduit 40 which has a valve 41 therein. Conduit 40 communicates with a coil 40a which is in heat exchange relationship with cell blocks 15 and 16. The second end of conduit 40a is connected by a conduit 40b to the inlet 50' of cell block 15. The outlet 51' of cell block 15 is connected by a conduit 40c to the first inlet of a pressure equalizer 44. A conduit 40d, having a valve 45 therein, communicates with the first outlet of pressure equalizer 44. A corresponding conduit system is provided for the reference fluid. A conduit 42, having a valve 43 therein, communicates with a coil 42a which is in thermal contact with blocks 15 and 16 and coil 40a. A conduit 42b communicates between coil 42a and the fluid inlet 50 of cell block 16. The fluid outlet 51 of cell block 16 is connected by a conduit 42c to the second inlet of pressure equalizer 44. A conduit 42d, having a valve 46 therein, communicates with the second outlet of pressure equalizer 44.

In normal operation, a standard fluid occupies conduit 42, coil 42a, conduit 42b, the fluid chamber in block 16, conduit 42c, the lower half of pressure equalizer 44 and conduit 42d. Valves 43 and 46 are closed so that the reference fluid is stationary. The sample fluid to be measured enters the system through conduit 40 and is removed through conduit 40d. It should be evident that coils 40a and 42a provide initial heat exchange between the two fluids so that the sample fluid entering cell block 15 tends to be at the same temperature as the reference fluid in cell block 16.

The radiation beam transmitted through the cell assembly is deviated from its initial path by an amount representative of the difference between the refractive indices of the two fluids being compared. If the emerging light beam is centered on barrier 23, equal amounts of radiation overlap onto photocells 21 and 22. This results in a zero signal being applied to the input of amplifier 25 so that motor 26 remains stationary. If the refractive index of the sample stream should change in a manner so that more radiation impinges upon photocell 21 than upon photocell 22, an output voltage of first polarity is produced. This voltage drives motor 26 to rotate block 18 in a direction so that the light beam is moved back to the center of barrier 23. If a greater amount of radiation should impinge on photocell 22 than upon photocell 21, a voltage of opposite polarity is produced so that block 18 is rotated in the opposite direction. Motor 26 thus tends to maintain the system in a balanced condition so that equal quantities of radiation impinge upon the two photocells. The degree of rotation required to maintain this balanced condition is an indication of the difference between refractive indices of the fluids being compared. The rotation of motor 26 can be observed by indicator 35, and a voltage representative of this rotation can be provided by telemetering potentiometer 34. This potentiometer can form a portion of a recorder-controller (not shown) so that an output signal is provided which can be used for control purposes.

Cell assembly 13 is illustrated in detail in Figures 2 and 3. Blocks 15 and 16 are provided with respective central passages 60 and 61 which form the fluid chambers. These two blocks are separated by a diagonal transverse plate 62 of radiation transparent material. An O-ring seal 63 surrounds plate 62 to prevent fluid leakage from chambers 60 and 61. The two blocks are held in assembled position by a plurality of screws 64. A first hollow spool 65 is fitted into a second hollow spool 66. Spool 65 has a plurality of openings 67 about one end thereof and spool 66 has a plurality of openings 68 about the opposite end thereof. These two spools are positioned within the enlarged outer end of chamber 61 in block 16. Spools 65 and 66 are retained in position by lens 17 which is retained against block 16 by a cap 70. A plurality of screws 71 hold cap 70 in position. An O-ring 72 prevents leakage from chamber 61. A similar assembly of spools is provided in chamber 60 of block 15. Corresponding elements are designated by like primed reference numerals. Spools 65' and 66' are retained in position by lens 14.

Sample inlet 50' is connected by passage 50a' in block 15 to an annular space 75' surrounding spool 66'. A passage 51a' in block 15 communicates between outlet 51' and a region of chamber 60 adjacent plate 62. The sample fluid flows through passage 50a' into space 75'. The fluid then flows through openings 68' into the annular space 76' between cylinders 65' and 66'. From space 76', the fluid enters chamber 60 through openings 67'. The fluid flows through chamber 60 and is vented through outlet passage 51a'. Blocks 15 and 16 and the perforated spools are formed of a heat conductive material such as copper. The blocks thus serve as a heat reservoir so that the incoming fluid rapidly acquires the temperature of the blocks. The passages formed by the spools permit an even distribution of heat between the fluid and blocks and minimize convection currents through chamber 60. Openings 67' permit the fluid to be introduced radially into the end of chamber 60 for more even distribution throughout chamber 60.

In some applications of the differential refractometer it is desired to compare the refractive indices of two flowing streams. The inlets and outlets of block 16 are identical to those in block 15 so that the same heat distribution is provided if a fluid is circulated through chamber 61.

Figure 4:
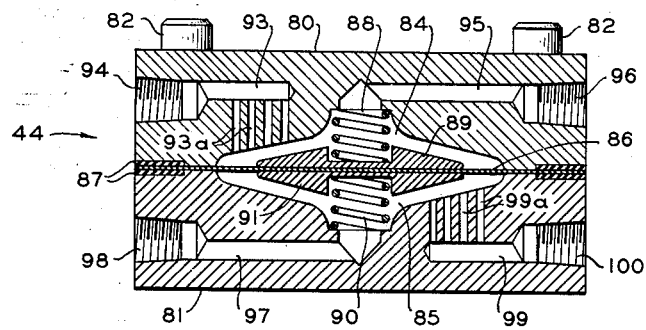
Figure 4 is a sectional view of the pressure equalizer of Figure 1.

As previously mentioned, it is important that the pressures of the two fluids be equalized. This can be accomplished to a large extent by incorporating a pressure regulator (not shown) in inlet conduit 40 to maintain the pressure the same as in chamber 61. Pressure equalizer 44 completes the pressure equalizing system. This equalizer is illustrated in Figure 4. First and second plates 80 and 81 are retained together by means of screws 82. Plates 80 and 81 are provided with recessed chambers 84 and 85, respectively, which are separated by a diaphragm 86 which is positioned between plates 80 and 81. Sealing gaskets 87 are provided at the periphery of diaphragm 86. A spring 88 extends between plate 80 and a backing plate 89 which is in engagement with diaphragm 86. A similar spring 90 and backing plate 91 are positioned in chamber 85.

Passages 93a and 93 communicate between chamber 84 and a fluid inlet 94. A passage 95 communicates between chamber 84 and a fluid outlet 96. A passage 97 communicates between chamber 85 and a second fluid inlet 98. Passages 99a and 99 communicate between chamber 85 and a second fluid outlet 100. Inlets 94 and 98 are connected to conduits 40c and 42c, respectively, of Figure 1; and outlets 96 and 100 are connected to conduits 40d and 42d, respectively. The pressures in the two conduits are thus equalized by deflection of diaphragm 86 to change the volumes of the two chambers. Springs 88 and 90 maintain the diaphragm at a center position in the absence of a pressure differential.

Figure 5:
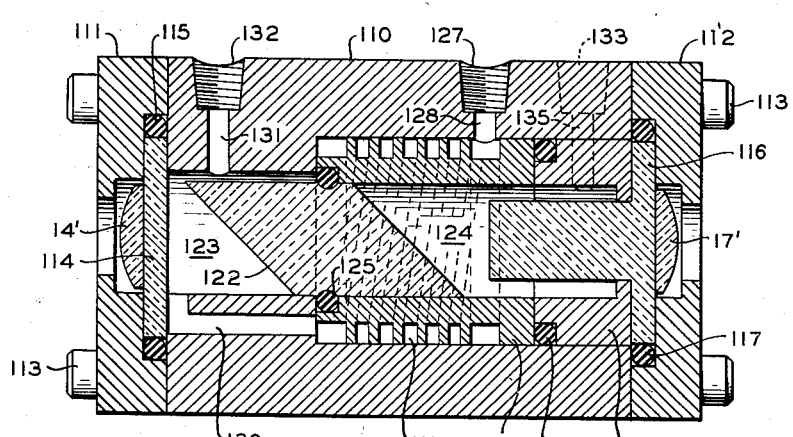
Figure 5 is a sectional elevation view of a second embodiment of the refractometer cell assembly.
Figure 6:
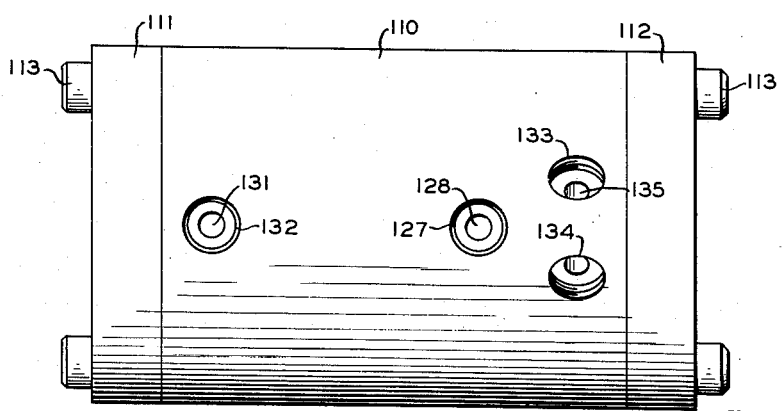
Figure 6 is a top view of the refractometer assembly of Figure 5.

In Figures 5 and 6 there is illustrated a second embodiment of the refractometer cell assembly. A cylindrical housing 110 is provided with end caps 111 and 112 which are retained in position by screws 113. A glass plate 114 and a lens 14' are positioned across the first end of housing 110 and retained in position by cap 111. An O-ring 115 prevents fluid leakage. The second end of housing 110 is closed by a flanged plug 116 of radiation transparent material which has a lens 17' attached thereto. Plug 116 extends into the interior of housing 110 and is retained in place by cap 112. An O-ring 117 prevents fluid leakage. A metal sleeve 118 having a spiral recess 119 in the periphery thereof occupies the center portion of housing 110. Sleeve 118 is retained in position by a second sleeve 129 which is held in place by plug 116. An O-ring 120 between sleeves 118 and 129 prevents fluid leakage. A cylindrical prism 122 divides the interior of housing 110 into spaced chambers 123 and 124. An O-ring 125 is fitted into a recess in prism 122.

A sample fluid inlet opening 127 in housing 110 is connected by a passage 128 to the first end of recess 119. The second end of recess 119 is connected by a passage 130 to chamber 123. A passage 131 extends between chamber 123 and an outlet opening 132. The sample fluide thus passes through spiral recess 119 prior to its entry into chamber 123. This results in efficient heat exchange between the sample fluid and both housing 110 and the reference fluid in chamber 124. A reference fluid inlet 133 is connected by a passage 135 to chamber 124. A fluid outlet opening 134 is connected by a corresponding passage to chamber 124. These latter openings permit the reference fluid to be positioned in or circulated through chamber 124. Plug 116 reduces the fluid volume in chamber 124 to provide more efficient heat exchange. This plug also reduces the radiation path in the chamber so that more opaque reference fluids can be utilized.

From the foregoing description it should be evident that there is provided in accordance with this invention an improved differential refractometer wherein efficient heat exchanging and pressure equalizing are accomplished. This enables the refractive index of a sample fluid to be compared with the refractive index of a reference fluid in a precise manner. While the invention has been described in conjunction with present preferred embodiments, it should be evident that it is not limited thereto.

What is claimed is:

1. Apparatus for use in measuring the refractive index of a fluid stream comprising a housing of heat conductive material having a generally cylindrical passage therethrough through which radiation can be transmitted, a radiation transparent plate positioned to divide said passage into first and second chambers, the plane of said plate making an angle other than 90° with the longitudinal axis of said passage, a fluid inlet in said housing, a generally cylindrical hollow member positioned within said housing so that the interior thereof forms at least a portion of one of said chambers, said member having a passage therein, and means defining an elongated fluid passage within said housing which communicates between said inlet and one of said chambers through the passage in said member so that fluid directed through said fluid passage is in intimate heat exchange relationship with said housing, and means defining an outlet passage which communicates between said one chamber and a region exterior of said housing.

2. Apparatus for use in measuring the refractive index of a fluid stream comprising a housing of heat conductive material having a generally cylindrical passage therethrough through which radiation can be transmitted, a radiation transparent plate positioned to divide said passage into first and second chambers, the plane of said plate making an angle other than 90° with the longitudinal axis of said passage, a fluid inlet in said housing, a first generally cylindrical hollow member positioned within said housing so that the interior thereof forms at least a portion of one of said chambers, said first member having a plurality of first radial passages therein near one end thereof, a second generally cylindrical member spaced from and enclosing said first member, said second member having a plurality of second radial passage therein near the end of said second member opposite said one end of said first member, a fluid inlet in said housing, means defining a fluid passage between said inlet and an annular chamber between said second member and said housing, and means defining an outlet passage which communicates between said one chamber and a region exterior of said housing.

3. The combination in accordance with claim 2 wherein said first radial passages are positioned adjacent the end of said one chamber opposite said plate, and wherein the outlet passage communicates with said one chamber adjacent said plate.

4. Apparatus for use in measuring the refractive index of a fluid stream comprising a housing of heat conductive material having a generally cylindrical passage therethrough through which radiation can be transmitted, a radiation transparent plate positioned to divide said passage into first and second chambers, the plane of said plate making an angle other than 90° with the longitudinal axis of said passage, a fluid inlet in said housing, a first generally cylindrical hollow member positioned within said housing so that the interior thereof forms at least a portion of one of said chambers, said first member having a plurality of first radial passages therein near one end thereof, a second generally cylindrical member spaced from and enclosing said first member, said second member having a plurality of second radial passage therein near the end of said second member opposite said one end of said first member, a first fluid inlet in said housing, means defining a first fluid passage between said first inlet and a first annular chamber between said second member and said housing, means defining a first outlet passage which communicates between said one chamber and a region exterior of said housing, a third generally cylindrical member positioned within said housing so that the interior thereof forms at least a portion of the other of said chambers, said third member having a plurality of third radial passages therein near one end thereof, a fourth generally cylindrical member spaced from and enclosing said third member, said fourth member having a plurality of fourth radial passages therein near the end of said second member opposite said one end of said third member, a second fluid inlet in said housing, means defining a second fluid passage between said second inlet and a second annular chamber between said fourth member and said housing, and means defining a second outlet passage which communicates between said other chamber and a region exterior of said housing.

5. The combination in accordance with claim 4 further comprising first and second converging lenses, and means positioning said lenses across the respective ends of the radiation passage in said housing.

6. Apparatus for use in measuring the refractive index of a fluid stream comprising a housing of heat conductive material having a generally cylindrical passage therethrough through which radiation can be transmitted, a radiation transparent plate positioned to divide said passage into first and second chambers, the plane of said plate making an angle other than 90° with the longitudinal axis of said passage, a fluid inlet in said housing, means defining a spiral fluid passage enclosing at least a portion of one of said chambers and communicating between said inlet and said other chamber, and means defining an outlet passage which communicates between said other chamber and a region exterior of said housing.

7. Apparatus for measuring the refractive index of a fluid stream comprising a housing of heat conductive material having a cylindrical passage therethrough through which radiation can be transmitted, a radiation transparent cylindrical prism positioned in said passage to divide same into two chambers, a sleeve of heat conductive material enclosing at least a portion of one of said chambers, said sleeve having a spiral recess in the periphery thereof, a first fluid inlet in said housing communicating with one end of said recess, the second end of said recess being in communication with the other of said chambers, and means defining an outlet passage which communicates between said other chamber and a region exterior of said housing.

8. The combination in accordance with claim 7 further comprising a cylindrical plug of radiation transparent material partially filling said one chamber.

9. The combination in accordance with claim 7 further comprising a second fluid inlet in said housing communicating with said one chamber, and a fluid outlet in said housing communicating with said one chamber.

10. The combination in accordance with claim 7 further comprising first and second converging lenses, and means positioning said lenses across the respective ends of the radiation passage in said housing.

11. Apparatus for measuring the refractive index of a fluid stream comprising a housing of heat conductive material having a cylindrical passage therethrough through which radiation can be transmitted, a cylindrical sleeve of heat conductive material positioned within said passage, said sleeve having a spiral recess in the periphery thereof, a first fluid inlet in said housing communicating with one end of said recess, a cylindrical prism of radiation transparent material positioned within said sleeve to divide said passage into first and second chambers, the faces of said prism being parallel to one another and making an angle other than 90° with the longitudinal axis of said passage, means forming a passage between the second end of said recess and said first chamber, a first fluid outlet in said housing communicating with said first chamber, a plug of radiation transparent material positioned in the end of said second chamber to reduce the volume thereof which can contain fluid, a plate of radiation transparent material positioned across the end of said first chamber remote from said plug, a second fluid inlet in said housing communicating with said second chamber, and a second fluid outlet in said housing communicating with said second chamber.

12. The apparatus of claim 11 further comprising a first converging lens secured to said plug, and a second converging lens secured to said plate, said lenses having their axes on the longitudinal axis of said passage.

References Cited in the file of this patent

UNITED STATES PATENTS

| | | |
|---|---|---|
| 830,225 | Haber | Sept. 4, 1906 |
| 2,427,996 | Seaman | Sept. 23, 1947 |
| 2,686,454 | Ruska | Aug. 17, 1954 |
| 2,724,304 | Crawford | Nov. 22, 1955 |